US012741210B2

(12) United States Patent
Hsu et al.

(10) Patent No.: US 12,741,210 B2
(45) Date of Patent: Sep. 22, 2026

(54) SHOOTER GAME DEVICE PROVIDED WITH INDIVIDUAL SCREENS

(71) Applicant: Tien-Shu Hsu, Taichung (TW)

(72) Inventors: Shun-Tsung Hsu, Taichung (TW); Chang-Yi Wang, Taichung (TW); Chia-Wei Liao, Taichung (TW)

(73) Assignee: Tien-Shu Hsu, Taichung City (TW)

( * ) Notice: Subject to any disclaimer, the term of this patent is extended or adjusted under 35 U.S.C. 154(b) by 707 days.

(21) Appl. No.: 17/774,683

(22) PCT Filed: Feb. 21, 2020

(86) PCT No.: PCT/CN2020/076210

§ 371 (c)(1), (2) Date: May 5, 2022

(87) PCT Pub. No.: WO2021/164005

PCT Pub. Date: Aug. 26, 2021

(65) Prior Publication Data

US 2022/0370905 A1 Nov. 24, 2022

(51) Int. Cl.
*A63F 13/52* (2014.01)
*A63F 13/837* (2014.01)

(52) U.S. Cl.
CPC ............ *A63F 13/52* (2014.09); *A63F 13/837* (2014.09)

(58) Field of Classification Search
CPC .... A63F 13/52; A63F 13/837; A63F 13/2145; A63F 13/426; A63F 13/818;
(Continued)

(56) References Cited

U.S. PATENT DOCUMENTS 6,791,575 B2 * 9/2004 Abboud ................... G09G 5/00 361/679.21
7,612,786 B2 * 11/2009 Vale .................... G06F 3/04883 345/173
(Continued)

FOREIGN PATENT DOCUMENTS

CN 2618220 Y 5/2004
CN 101282771 A 10/2008
(Continued)

*Primary Examiner* — Ankit B Doshi
(74) *Attorney, Agent, or Firm* — MUNCY, GEISSLER, OLDS & LOWE, P.C.

(57) ABSTRACT

A shooter game device provided with individual screens, the device comprising a game processing element, a table, a main screen, multiple individual operation elements and multiple individual screens; the game processing element provides a shooter game and controls a game process of the shooting game and generates a main game image; the main screen is provided on the table and displays the main game image; the multiple individual operation elements are provided on the table and are operated by players to generate an operation signal so as to change the game process; the multiple individual screens are provided on the table and correspond one-to-one to the multiple individual operation elements, and each of the individual screens presents an individual game image of the corresponding player; according to the foregoing, players can obtain personalized specific information by means of the individual screens, such as game explanations, education and guidance, special game effects, scores, and so on, so as to meet personalized usage requirements.

9 Claims, 6 Drawing Sheets

(58) Field of Classification Search
CPC ......... A63F 2300/8076; G07F 17/3209; G07F 17/322; G07F 17/3211; G07F 17/3272; G06F 2203/04808
See application file for complete search history.

(56) References Cited

U.S. PATENT DOCUMENTS 8,696,428 B1* 4/2014 Post .................... G07F 17/3295 463/16
8,715,061 B1* 5/2014 Post ........................ G07F 17/38 463/20
9,092,931 B2* 7/2015 Loose ................... G07F 17/322
2009/0005150 A1* 1/2009 Haveson ............. G07F 17/3276 463/20
2009/0143141 A1* 6/2009 Wells .................. G07F 17/3239 463/37
2009/0197676 A1 8/2009 Baerlocher et al.
2009/0325686 A1* 12/2009 Davis ...................... G07F 17/32 463/25
2010/0009733 A1* 1/2010 Garvin .................... A63F 13/10 463/37
2011/0159956 A1 6/2011 Itskov et al.
2012/0004023 A1* 1/2012 Hsu ....................... A63F 9/0468 463/22
2012/0270635 A1 10/2012 Colceri
2014/0179392 A1* 6/2014 Post .................... G07F 17/3276 463/16
2014/0309021 A1 10/2014 Munakata et al.
2016/0093133 A1* 3/2016 Kelly .................. G07F 17/3211 463/31
2016/0343200 A1* 11/2016 Matsumura ......... G07F 17/3216
2016/0343201 A1* 11/2016 Kido ................... G07F 17/3216
2017/0076553 A1* 3/2017 Washington .......... A63F 13/352
2018/0089959 A1* 3/2018 Na ...................... G07F 17/3211
2019/0381400 A1 12/2019 Hussman et al.
2020/0001174 A1 1/2020 Kalpakian et al.
2022/0047947 A1* 2/2022 Kmita ................... A63F 13/537
2022/0266129 A1* 8/2022 Lee ......................... A63F 13/24
2022/0370905 A1* 11/2022 Hsu ....................... A63F 13/843

FOREIGN PATENT DOCUMENTS

| | | | |
|---|---|---|---|
| CN | 103550932 | A | 2/2014 |
| CN | 204764152 | U | 11/2015 |
| CN | 107684715 | A | 2/2018 |
| CN | 207708495 | U | 8/2018 |
| CN | 110141852 | A | 8/2019 |
| CN | 110180168 | A | 8/2019 |
| CN | 110251938 | A | 9/2019 |
| CN | 110448906 | A | 11/2019 |
| EP | 1584363 | A2 | 10/2005 |
| JP | 2017192538 | A | 10/2017 |
| TW | M357307 | U | 5/2009 |
| TW | 201034722 | A | 10/2010 |
| TW | 201325677 | A | 7/2013 |
| WO | WO9422544 | A1 | 10/1994 |
| WO | WO2014094141 | A1 | 6/2014 |

* cited by examiner

SHOOTER GAME DEVICE PROVIDED WITH INDIVIDUAL SCREENS

FIELD OF THE INVENTION

The invention relates to a shooter game device, in particular to a shooter game device for multiple persons playing games together on a tabletop.

BACKGROUND OF THE INVENTION

Shooting game is one of the popular types of games, and in addition to traditional shooting, the extended types include catching fish (netting fish), throwing stones (smashing bricks) and the like, which can allow a single person to play or a plurality of persons to play together, wherein a single player type game machine can meet the requirement that the player can play freely without pressure. A multi-player type game machine is more widely favored and welcomed by players due to the additional elements of competition and having fun together.

The Chinese Patent Publication CN101282771A discloses a game device for a plurality of players to play a game together, and the game allows the players to launch a fishing net for fishing. It provides a large game machine which can accommodate a plurality of players, and the plurality of players are respectively positioned around the game machine to play the game.

The conventional game machine as described above is used for a plurality of players play simultaneously, so that in order to meet the requirements of most players, the display screen of the game machine only displays common game information, and the personalized requirements of each player cannot be met. For example, a game effect is usually generated when one of the playing players shot a jackpot, and an animation of the game effect will hinder visions of other players. For game fairness, it is often necessary to pause the game. That is, when a player wins the jackpot, other players cannot shoot because of displaying an animation, and the progress of other players and the whole game are affected, therefore, in order to avoid delaying the game progress, the playing time of the game effect must be accelerated.

In addition, the game image displayed by the display screen is generated according to the operation of a plurality of players and the amount of information in the game image is large, so that the beginning player will have the problem that the information is difficult to interpret. The beginning player must spend time studying the game information of the shot objects, the special shot objects (machine gun), etc., which makes the entry threshold of the game high. In order to reduce the entry threshold, dealers print or attach the game information of the shot objects, the special shot objects and the like on the blank of the machine tabletop. However, players still need a lot of game exercises to master the pulsation of game play, which obviously cannot meet the use requirements.

SUMMARY OF THE INVENTION

It is a primary object of the present invention to disclose a shooter game device capable of providing personalized game information according to player operation.

To achieve the above object, the present invention provides a shooter game device provided with individual screens for at least one player to play a shooting game. The shooter game device includes a game processing element, a tabletop, a main screen, a plurality of individual operation elements, and a plurality of individual screens. The game processing element provides the shooting game, controls a game progress of the shooting game and generates a main game image. The tabletop includes a central area and a surrounding area surrounding the central area, and the main screen is arranged in the central area, connected with the game processing element and used for displaying the main game image. The plurality of individual operation elements are arranged in the surrounding area, connected with the game processing elements, and are disposed for the at least one player to select to play the shooting game and the at least one player operate the plurality of individual operation elements to generate an operation signal to change the game progress. The plurality of individual screens are arranged in the surrounding area and connected with the game processing element, the plurality of individual screens correspond to the plurality of individual operation elements one by one, and each individual screen respectively presents a individual game image corresponding to the player.

Accordingly, each player can change the game progress through the operation signal generated by the individual operation element and the use requirement of obtaining personalized game information is met by presenting the corresponding individual game image through the corresponding individual screen.

DETAILED DESCRIPTION OF THE PREFERRED EMBODIMENTS

Figure 1:
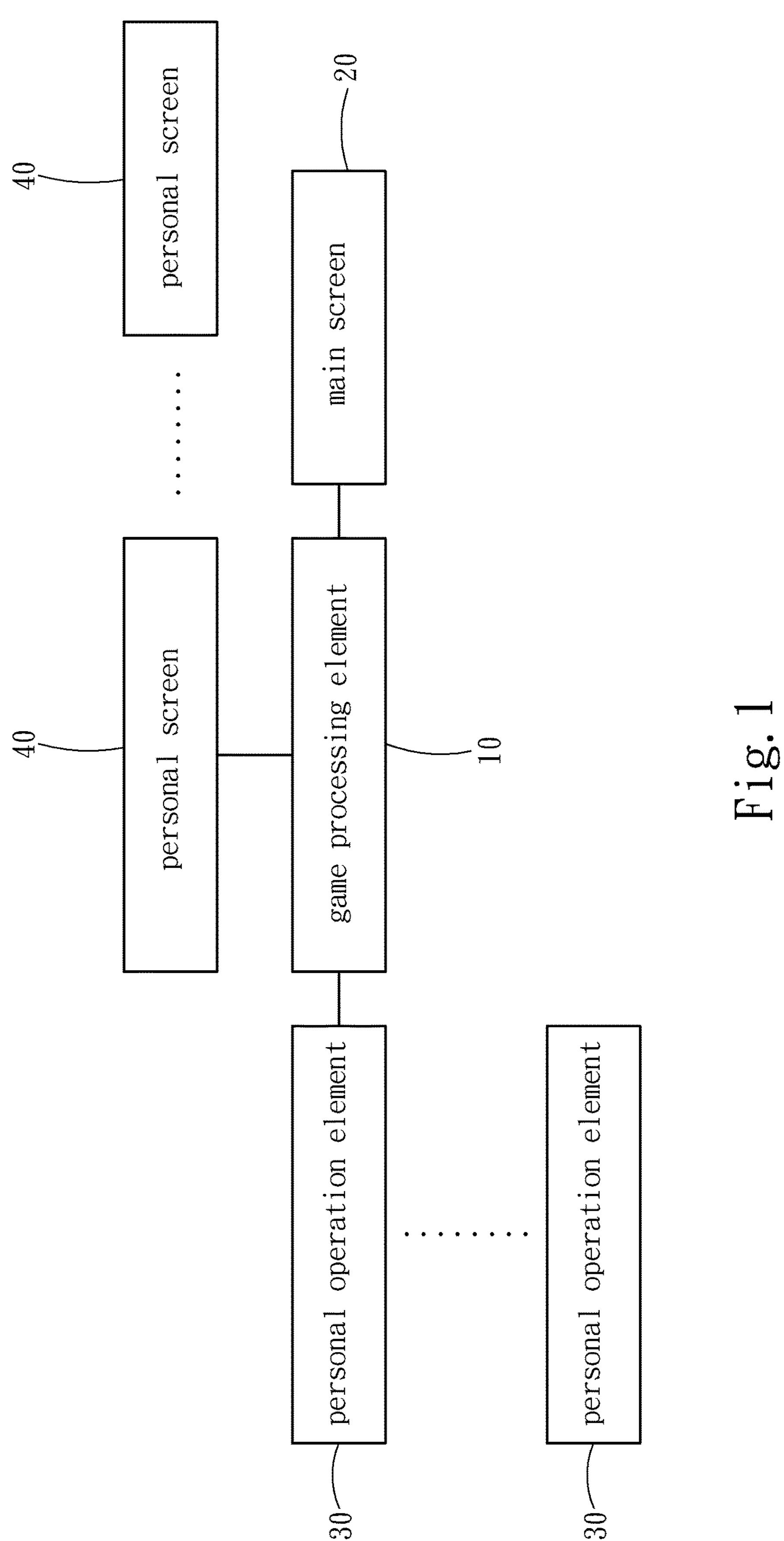
FIG. 1 is a block diagram of the system of the present invention.

The detailed description and technical content of the present invention will now be described with reference to the accompanying drawings as follows.

Referring to FIGS. 1, 2, 4 and 5, the present invention is a shooter game device provided with individual screens for at least one player to play a shooting game. The shooter game device comprises a game processing element 10, a tabletop 50, a main screen 20, a plurality of individual operation elements 30, and a plurality of individual screens 40. The game processing element 10 provides a shooting game, controls a game progress of the shooting game and generates a main game image 21 (shown in FIG. 4). The tabletop 50 includes a central area 51 and a surrounding area 52 surrounding the central area 51. The main screen 20 is provided at the central area 51 and connected to the game processing element 10 for displaying the main game image 21.

The plurality of individual operation elements 30 are disposed in the surrounding area 52 and connected to the game processing element 10. The plurality of individual operation elements 30 are disposed for at least one player to select to play the shooting game, and the at least one player operate the plurality of individual operation elements to generate an operating signal is generated to change the game progress. The plurality of individual screens 40 are disposed in the surrounding area 52 and connected to the game processing element 10. The plurality of individual screens 40 corresponds to the plurality of individual operation elements 30 one by one, and each of the individual screens 40 respectively presents a corresponding individual game image 41 of the player (shown in FIG. 5).

Figure 2:
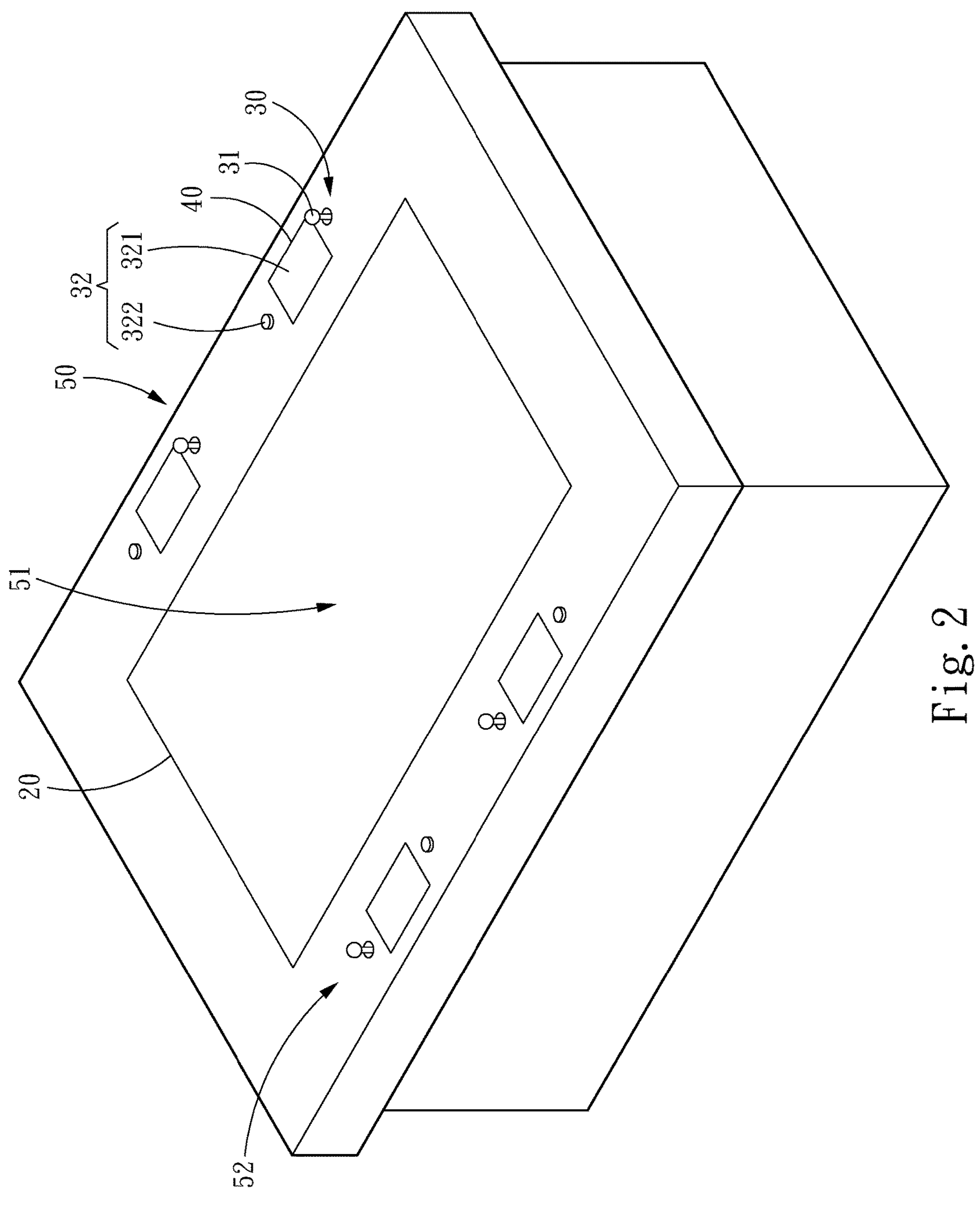
FIG. 2 is a schematic diagram of a game machine according to one embodiment of the present invention.
Figure 4:
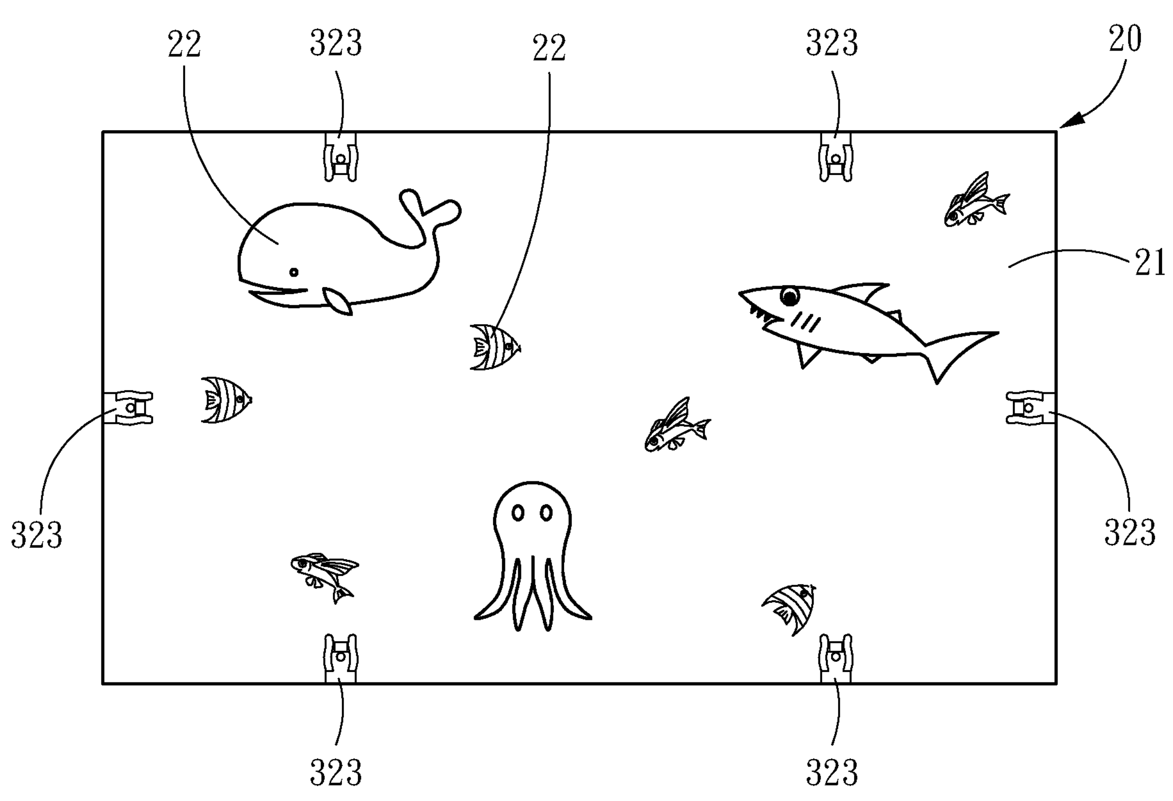
FIG. 4 is a schematic diagram of a main game image of the main screen of the present invention.

As shown in FIGS. 2 and 4, in one embodiment, each of the individual operation elements 30 includes a direction control element 31 and an input interface 32. The input interface 32 may include a point button 321 and an action button 322, wherein the point button is used for changing a point of a game betting, and the action button 322 acts as a firing switch of a canon 323 to control the canon 323 shooting bullets to attack any one of a plurality of shot objects 22. The point button 321 and the individual screen 40 can be combined into a touch screen. In one embodiment, the direction control element 31 is a joystick, the joystick allows the player to swing the joystick left or right to rotate a firing direction of the canon 323, or allows the player to perform a lock firing on the shot object 22 or switch a locked target, such as by pushing the joystick down or other operating manner to perform the lock firing or switch the locked target.

Figure 3:
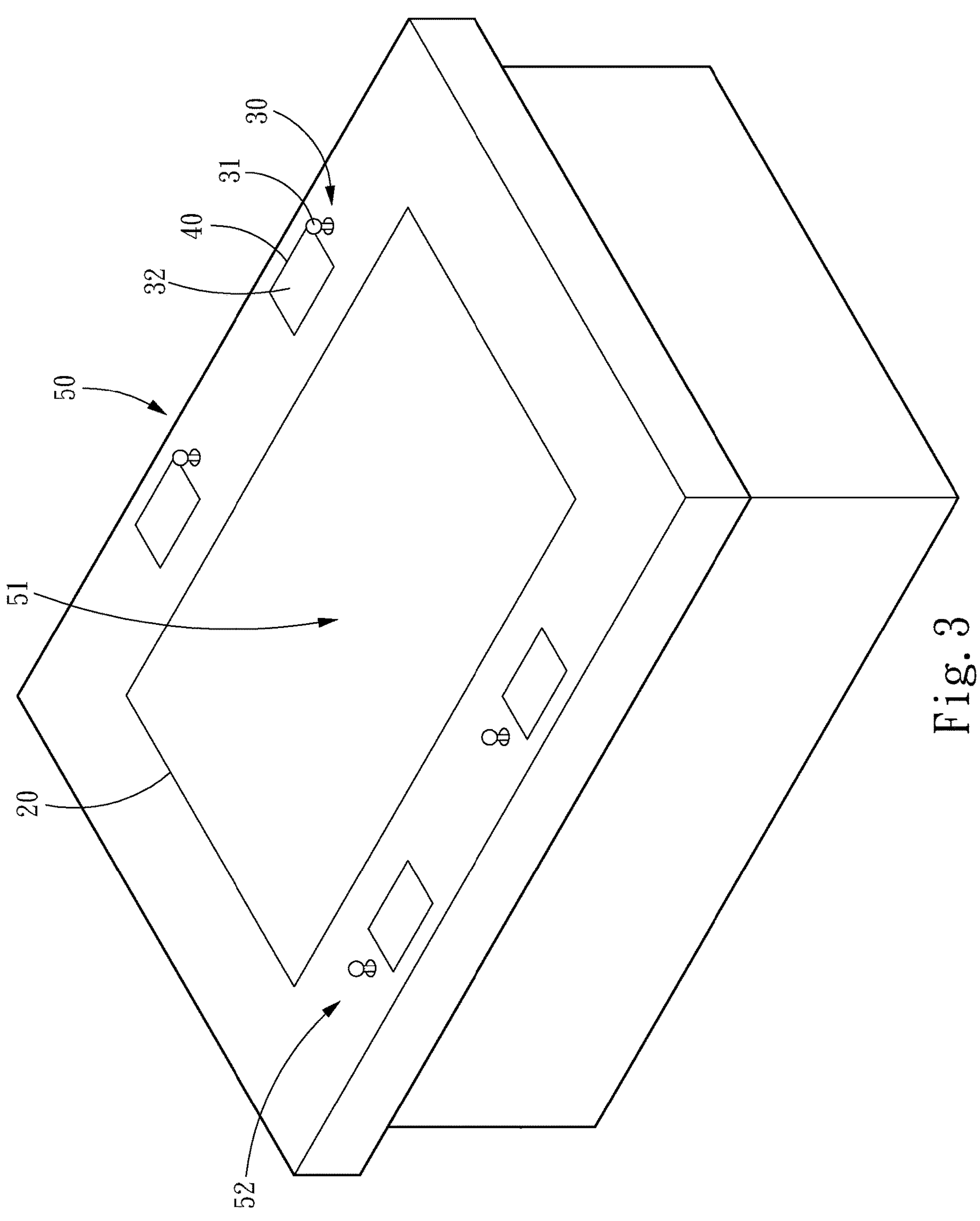
FIG. 3 is a schematic diagram of a game machine according to another embodiment of the present invention.
Figure 5:
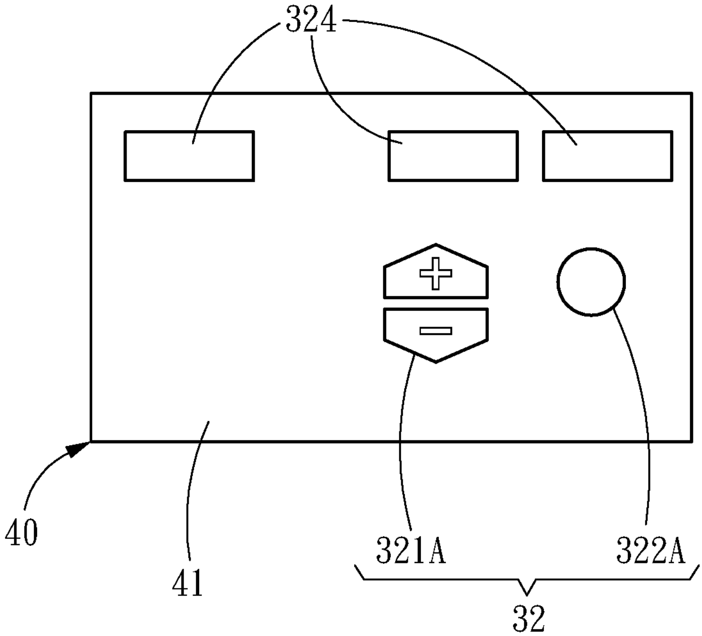
FIG. 5 is a first schematic diagram of a individual game image of the individual screen of the present invention.

Referring to FIGS. 3 and 5 which are schematic diagrams of another embodiment of the game machine, each of the individual operation elements 30 includes a direction control element 31 and an input interface 32. In this embodiment, the input interface 32 and the individual screen 40 are combined into a touch screen that provides both input and display functions. That is, the input interface 32 displays a point button 321A and an action button 322A which are virtual on the individual screen 40, and the input interface 32 also displays a plurality of function buttons 324 providing functions such as language selection, game rules explanation, automatic shooting, etc. Thus, on the tabletop 50, each player uses the touch screen as the input interface 32 and the individual screen 40 at the same time, as well as uses the direction control element 31 to play the shooting game.

Figure 6:
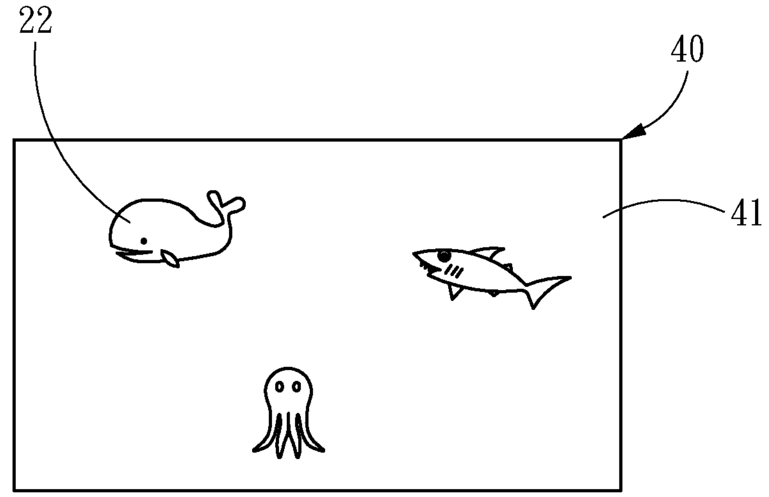
FIG. 6 is a second schematic diagram of a individual game image of the individual screen of the present invention.

Referring to FIGS. 4 and 6, the individual game image 41 presented to the corresponding player by the individual screen 40 may be changed according to the personal requirements of the corresponding player. In one embodiment, the individual game image 41 is generated through simplifying the main game image 21 by the game processing element 10 according to the operating signal of the corresponding individual operation element 30. In more detail, as shown in FIG. 4, the main game image 21 displays the entire information of the game, such as shot objects 22 of various sizes. As shown in FIG. 6, the individual game image 41 is simplified according to the operation signal of the corresponding individual operation element 30, and a simplify manner can be changed by the operation signal from the player. For example, the player can control the individual game image 41 to display only shot objects 22 with a certain score (such as larger fish), or to display only shot objects 22 on which a lock shooting can be performed or the shot objects 22 to be shot designated by the player, etc.

Figure 7:
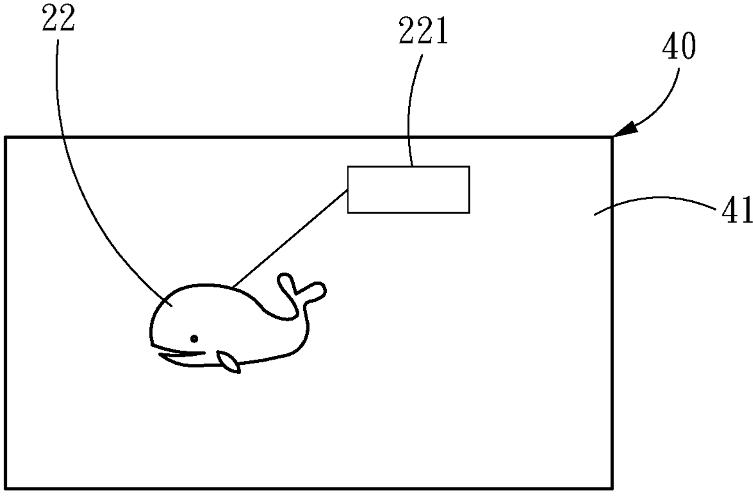
FIG. 7 is a third schematic diagram of a individual game image of the individual screen of the present invention.

Referring to FIG. 7, in one embodiment, the individual game image 41 displays a specific information generated by the game processing element 10 according to the operation signal of the corresponding individual operation element 30, and the specific information may be game instructions or operational guidance, etc. In more detail, when a player needs a game instruction or operational guidance, a corresponding operation signal is generated by the individual operation element 30 to control the individual game image 41 to display the information 221 of the shot object 22, and the information 211 includes a point of the shot object 22, whether the shot object can be locked, a game instruction, operational guidance, or etc. In order to clearly show the information of the shot object 22, the information 221 of different shot object 22 may be displayed in turn.

In one embodiment, the individual game image 41 displays a specific information of the corresponding player according to the game progress. That is, the specific information may be a game effect, a personal point, or etc. For example, the shooting game includes a plurality of lockable shot objects 22, and when the shot objects 22 appear on the main screen 20, they may appear simultaneously on the individual game image 41 (as shown in FIG. 6).

Figure 8:
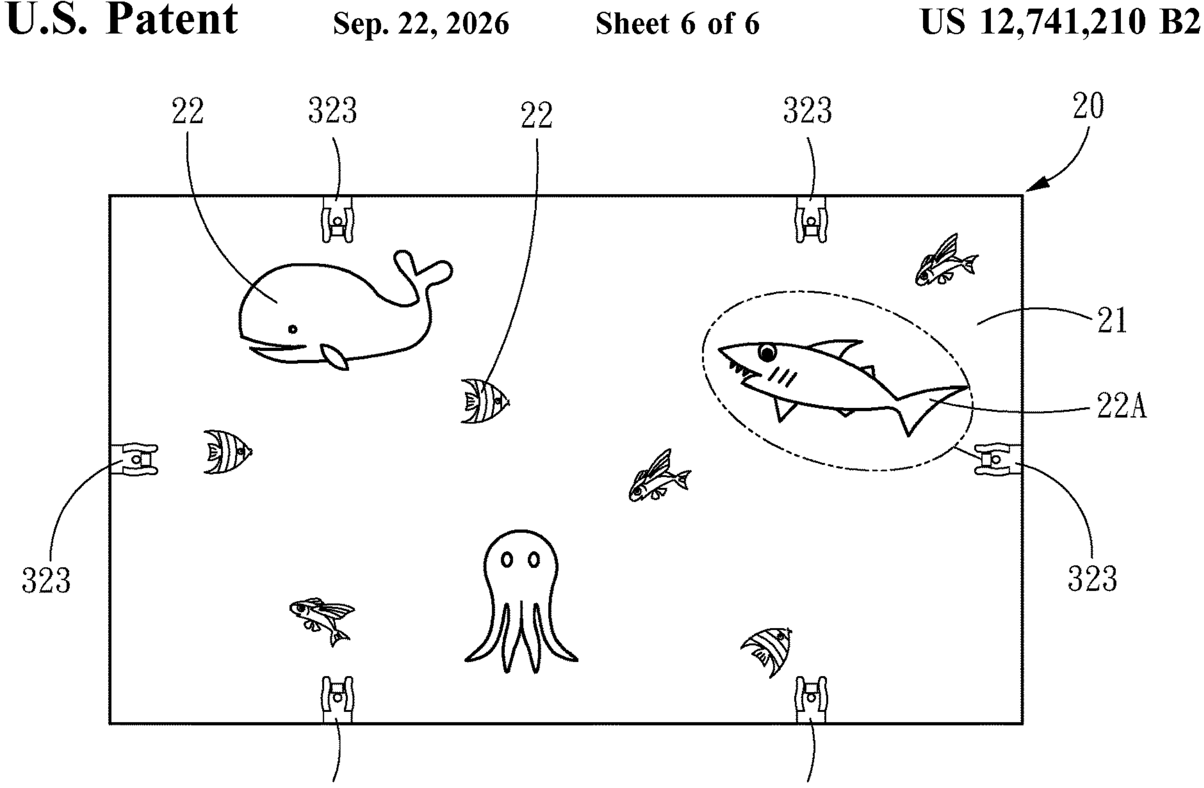
FIG. 8 is a fourth schematic diagram of a individual game image of the individual screen of the present invention.

Referring again to FIGS. 2 and 8, the player may operate the individual operation element 30 to lock and shoot, e.g., the player may push down the direction control element 31 or other operate manner to lock. As shown in FIG. 8, the specific shot object 22A is locked by the player by circling the specific shot object 22A with a dashed line. When the player strikes the locked specific shot object 22A, a corresponding game effect may appear on the individual game image 41, so that the game effect does not interfere with other players playing the game.

Figure 9:
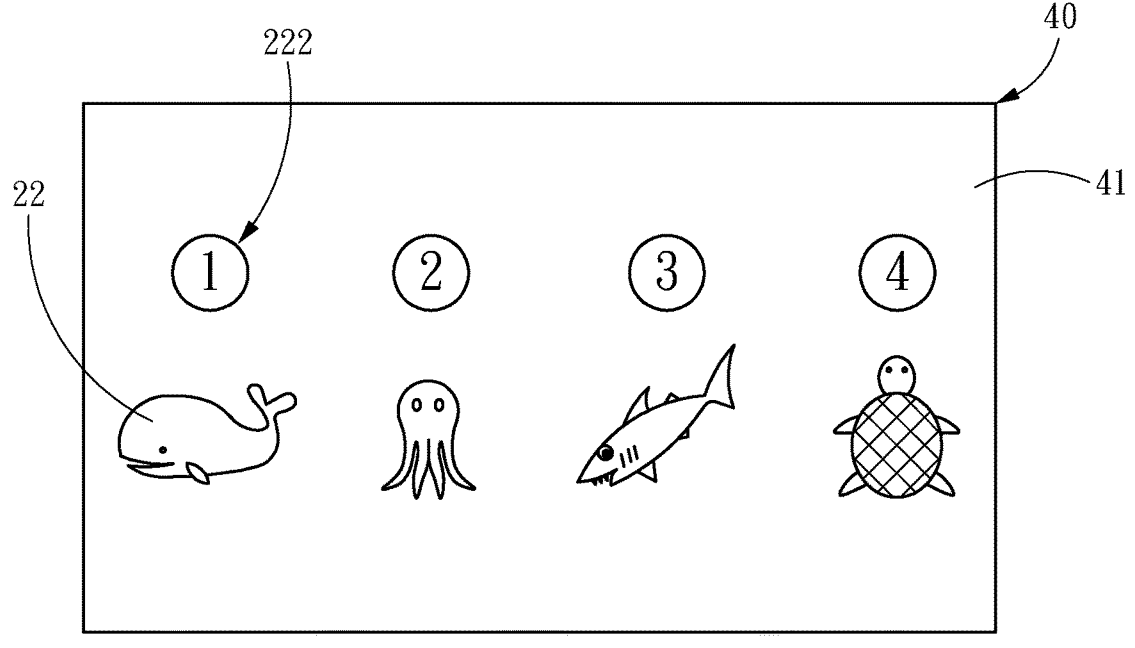
FIG. 9 is a fifth schematic diagram of a individual game image of the individual screen of the present invention.

Referring to FIG. 9, in one embodiment, the individual game image 41 displays a specific information according to the operation signal of the corresponding individual operation element 30 and the game progress. More specifically, the specific information is a personalized game image generated by the player's adjustment according to the requirement. For example, when the shooting game includes a plurality of lockable shot objects 22, the player may operate the individual operation element 30 to generate a lock shooting sequence 222 of the plurality of shot objects 22, and the lock shooting sequence 222 is displayed on the individual game image 41. The player can quickly switch to the target to be performed the locked shooting by pushing down the direction control element 31 for a plurality of times with aid of the lock shooting sequence 222 in the individual game image 41.

In summary, the advantages of the present invention at least include:

1. The player can obtain personalized specific information through the individual screen so as to meet the personalized use requirement.
2. The game effect obtained by the player can be displayed on the individual screen of the corresponding player, so that the game playing of other players is prevented from being interfered.
3. The individual screen may provide game instructions, lock information of the shot object, and operation, etc. to assist the player in playing the game.

What is claimed is:

1. A shooter game device provided with individual screens for at least one player to play a shooting game, the shooter game device comprising:

a game processing element, providing the shooting game, controlling a game process of the shooting game and generating a main game image;

a tabletop, provided with a central area and a surrounding area surrounding the central area;

a main screen, arranged in the central area, connected with the game processing element, and disposed to display the main game image, wherein the main game image displays an entire information of the shooting game;

a plurality of individual operation elements, arranged in the surrounding area, and connected with the game processing element, wherein the plurality of individual operation elements are disposed for the at least one player to select to play the shooting game and the at least one player operates the plurality of individual operation elements to generate an operation signal to change the game process of the shooting game; and a plurality of individual screens, arranged in the surrounding area and connected with the game processing element, wherein the plurality of individual screens correspond to the plurality of individual operation elements one by one, and each of the plurality of individual screens respectively presents an individual game image corresponding to the player, wherein the individual game image is generated through simplifying the main game image by the game processing element according to the operation signal of the corresponding individual operation element, and wherein the shooting game includes a plurality of lockable shot objects, and the plurality of lockable shot objects are simultaneously displayed on the individual game image when the plurality of lockable shot objects appear on the main screen.

2. The shooter game device according to claim 1, wherein each of the plurality of individual operation elements includes a direction control element and an input interface.

3. The shooter game device according to claim 2, wherein the input interface includes a point button and an action button.

4. The shooter game device according to claim 3, wherein the individual screen is a touch screen and the point button is combined with the individual screen.

5. The shooter game device according to claim 2, wherein the individual screen is a touch screen and the input interface is combined with the individual screen.

6. The shooter game device according to claim 1, wherein the individual game image displays a specific information generated by the game processing element according to the operation signal of the corresponding individual operation element.

7. The shooter game device according to claim 1, wherein the individual game image displays a specific information of the corresponding player according to the game process of the shooting game.

8. The shooter game device according to claim 1, wherein the individual game image displays a specific information according to the operation signal of the corresponding individual operation element and the game process.

9. The shooter game device according to claim 8, wherein the player operates the individual operation element to generate a lock shooting sequence of the plurality of lockable shot objects, and the lock shooting sequence is displayed on the individual game image.

* * * * *